Patented May 31, 1932

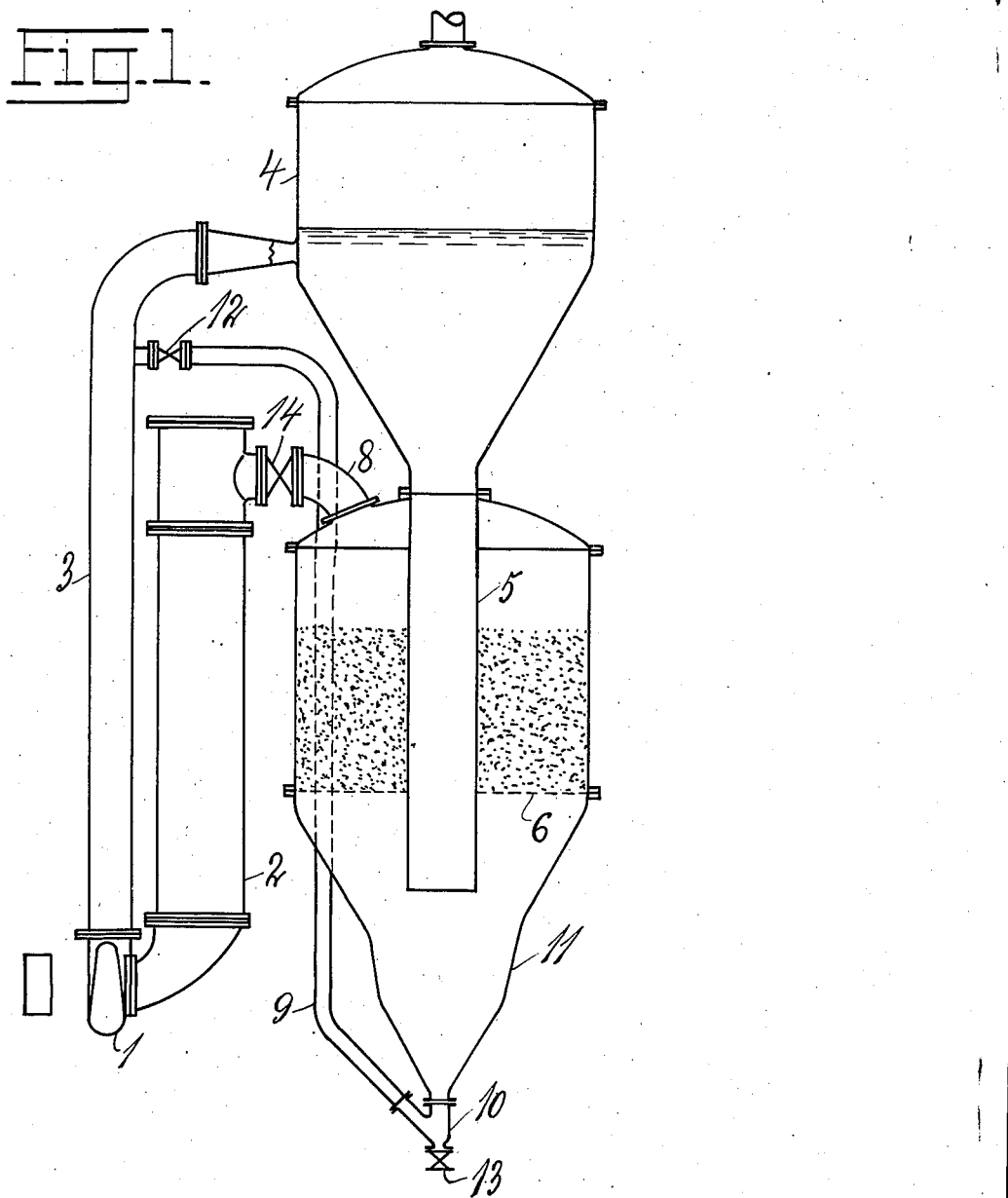

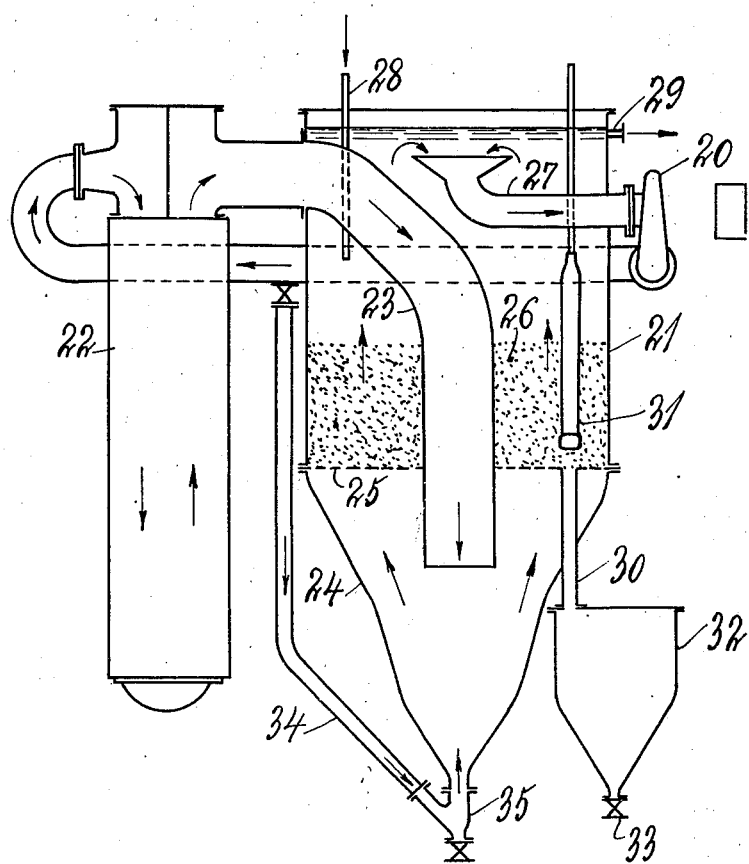

1,860,741

UNITED STATES PATENT OFFICE

FINN JEREMIASSEN, OF OSLO, NORWAY

CRYSTALLIZATION APPARATUS

Application filed February 9, 1928, Serial No. 253,194, and in England February 14, 1927.

It is known in connection with the crystallizing of solid substances from solutions to bring about supersaturation at one place in the apparatus to be used, by evaporation or cooling and to release the supersaturation at another place by passing the supersaturated solution from below upwards through a suspension of crystals of the substance to be precipitated.

The present invention has for its object to provide an apparatus suitable for carrying this process into effect. This apparatus involves several advantages as compared with apparatus constructions hitherto known. An important characteristic feature of this apparatus consists in that the connection channel between the place of supersaturation and the space below the collection of granules is passed in downward direction through the collection of granules.

In the accompanying drawings two embodiments of the invention are illustrated.

In Fig. 1 a centrifugal pump 1 draws heated and nearly saturated solution for example common salt brine from a heater 2 of known construction, with steam heating, and forces it through a pipe 3 up to an evaporator 4, where it becomes supersaturated by the evaporation of water. From this point the solution passes through a central pipe 5 down below a perforated bottom 6 up through this bottom and the suspended crystal collection 7 through pipe 8 and heater 2 back to the pump.

In the crystal collection 7 the supersaturation is released by deposition of common salt upon the crystals which are thereby caused to expand. Fresh, nearly saturated common salt solution is added in a known manner and the crystals which have expanded to the size desired and which for the greater part remain in the bottom portion of the suspension 7 can in a known manner be removed through a discharge pipe from the bottom 6 (not illustrated).

From the pressure pipe 3 a small proportion of the circulating solution is passed through the pipe 9 and connection pipe 10 up into the funnel 11.

In the hitherto known apparatus of similar type the granules carried along by the solution are apt to adhere to the walls of the conduit between the part of the apparatus in which the supersaturation is called forth and the part of the apparatus where it is released, and will rapidly expand in the supersaturated solution so that the operation must be stopped after some time for the purpose of cleaning the apparatus.

By the arrangements according to the present invention this difficulty is avoided in a more efficient manner than by all hitherto known arrangements.

The conditions which in known types of apparatus caused small granules to adhere to the pipe or conduit for the supersaturated solution, are eliminated, because the pipe can be made short with few or no flange connections and with very steep (in the illustrated example vertical) wall elements.

The jet from the pipe 5 loses its energy by becoming mixed with the upwardly directed current, which produces itself in the funnel 11, without the aid of baffles (which always are very liable to cause wall coatings) and thus provides for the uniform distribution of pressure below the perforated suspension bottom 6 which is absolutely necessary.

An important advantage of the feature that the pipe 5 is passed from above down through the crystallizer further consists therein that all large or comparatively large pipe connections between the crystallization vessel and the evaporator on the one hand and the heater on the other hand are placed at elevated points. If the heater is to be emptied and cleaned this can thus take place, even if the valve 14 is not tight, without the substantial portion of liquid and crystals contained in the apparatus being removed.

The arrangement further renders it possible, when desirable, to operate with granules of such a small size that comparatively large proportions of the same will circulate with the solution, because the flow upwards through the connecting pipe 10 maintains in constant motion or suspension the small granules collecting at the bottom in 11, so that they cannot stick together. Sooner or later they will therefore all enter into the main current from 5 which passes upwards along the walls in 11. When the cock 12 on pipe 9 is closed fully or partly the granules which it is desired to remove from the circulation can be caught in the pipe connection 10.

By means of the arrangements according to the invention these important advantages are attained without causing the circulating supersaturated solution—as in the known apparatus—to enter into contact with baffles or with surfaces situated at a small angle to the horizontal where circulating granules are very liable to adhere and grow. The circulating supersaturated solution will enter into contact only with the surface of the suspension of small granules and with the steep smooth walls in funnel 11.

Figure 1 shows an example of an apparatus in which the supersaturation is brought about by evaporation, but it is a matter of course that the described arrangement, viz. the passing of the main flow through a pipe from the top downwards through the suspension and a small auxiliary flow from below upwards against the same can be used also when the supersaturation is effected by cooling.

Figure 2 illustrates diagrammatically an embodiment of the invention where the supersaturation is called forth by cooling.

A centrifugal pump 20 draws saturated solution, for example of Glauber's salt, from the container 21 and forces it through a cooler 22 of known construction.

Through the cooling therein, the same solution becomes supersaturated but not beyond its metastable limit. Through the pipe 23 it passes down into the funnel 24, up through the perforated bottom 25 and the collection therein of granules 26 and then through the pipe 27 back to the pump 20.

In the collection of granules 26 the supersaturation is released by Glauber's salt precipitating on the granules so that they expand. Fresh, approximately saturated solution of Glauber's salt of a temperature higher than that prevailing in the container 21, is supplied through the pipe 28, and the solution from which the desired quantity of Glauber's salt has been removed, passes off through the outlet 29.

The granules which have expanded to the size desired and which preponderantly remain at the bottom of the suspension 26, can in a known manner be removed through a discharge pipe 30 by lifting the valve 31. The salt falls down into the container 32, from which it is removed through the cock 33.

From the pipe 34 a small portion of the circulating solution is passed through the connection pipe 35 up into the funnel 24 in order to prevent small granules which have been carried along through the pipe 23 from collecting in the bottom part of the funnel 24 and adhering to the wall of the latter.

The apparatus as above described comprises in combination two different features: On the one hand the special arrangement of the channel connecting the place of supersaturation with the space below the collection of granules, and on the other hand the means to supply solution, which is not or only slightly supersaturated to the space below the opening of the connection channel. Each one of the said features represents an independent invention, which involves important advantage also when used separately. The present invention is therefore not limited to the combined application of both of said arrangements.

I claim:

1. Crystallization apparatus of the type having a crystallizing chamber adapted to contain a collection of granules acting as seed crystals, in combination with supersaturation means outside of said crystallizing chamber and with means to produce and convey a flow of solution from the supersaturator and into and through the space occupied by the said collection of granules the said crystallizing chamber having a perforated partition functioning as a means to support the collection of granules, means to convey a downwardly directed main flow of supersaturated solution from the said supersaturator into the space below the said perforated partition and means to supply a minor flow of solution from a point in a channel conveying solution to the supersaturator and into the lower part of the space below the partition, in a direction opposite to that of the incoming main flow of solution.

2. A crystallization apparatus comprising a seed crystal chamber having a perforated suspension bottom for granules, a funnel-shaped extension below said bottom and a dome above said crystal chamber; supersaturation means exteriorly positioned as regards said chamber including an evaporator vessel, a conduit leading from the vessel through said dome and the perforated bottom into said funnel, a heater for suitable saturated solution having tubular connection with said vessel adapted to force said solution into the vessel, a return passage from said dome to the heater and a branch pipe from said tubular connection opening through the bottom of said funnel adapted to furnish a counter current of solution opposite that coming through said conduit.

3. A crystallization apparatus of the type having a seed crystal chamber, provided with a perforated partition functioning as a means to support the seed crystals, supersaturation means outside of said seed crystal chamber and means to produce and convey a circulating flow of solution from the said supersaturator into the space below the said perforated partition and in an upward direction through the space occupied by a collection of granules acting as seed crystals, the said means for conveying solution to the space below the perforated partition comprising a substantially vertical discharge pipe open at the bottom end and extending from above through the space occupied by the seed crystals, through the perforated partition and into the space below the same.

In testimony whereof I have signed my name to this specification.

FINN JEREMIASSEN.